United States Patent
Challener et al.

(10) Patent No.: US 9,240,262 B1
(45) Date of Patent: Jan. 19, 2016

(54) SYSTEMS AND METHODS FOR DISTRIBUTED PRESSURE SENSING

(71) Applicant: General Electric Company, Schenectady, NY (US)

(72) Inventors: William Albert Challener, Niskayuna, NY (US); Sabami Palit, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/336,105

(22) Filed: Jul. 21, 2014

(51) Int. Cl.
*H01B 9/00* (2006.01)
*G01L 1/24* (2006.01)
*G01M 11/00* (2006.01)

(52) U.S. Cl.
CPC ............. *H01B 9/005* (2013.01); *G01L 1/242* (2013.01); *G01L 1/246* (2013.01); *G01M 11/31* (2013.01)

(58) Field of Classification Search
CPC ........ H01B 9/005; G01L 1/242; G01L 1/246; G01M 11/31
See application file for complete search history.

(56) References Cited

U.S. PATENT DOCUMENTS

| | | | |
|---|---|---|---|
| 5,309,540 A | 5/1994 | Turpin et al. | |
| 5,317,576 A | 5/1994 | Leonberger et al. | |
| 5,515,459 A | 5/1996 | Farhadiroushan | |
| 5,671,307 A | 9/1997 | Lauzon et al. | |
| 5,706,079 A | 1/1998 | Kersey | |
| 5,760,391 A | 6/1998 | Narendran | |
| 5,905,745 A | 5/1999 | Grubb et al. | |
| 6,016,702 A | 1/2000 | Maron | |
| 6,058,226 A | 5/2000 | Starodubov | |
| 6,885,784 B2 | 4/2005 | Bohnert | |
| 6,901,187 B2 | 5/2005 | Haroud et al. | |
| 7,362,422 B2 | 4/2008 | DiFoggio et al. | |
| 7,940,389 B2 | 5/2011 | Rogers et al. | |
| 8,253,945 B2 | 8/2012 | Gahan et al. | |
| 8,256,298 B2 | 9/2012 | Suijlen et al. | |
| 2010/0154553 A1 | 6/2010 | Phan Le et al. | |

(Continued)

FOREIGN PATENT DOCUMENTS

EP 1040330 B1 4/2013

OTHER PUBLICATIONS

Jansen et al., "High Pressure Fiber-Optic Sensor With Side-Hole Fiber", Fiber Optic Sensors II, vol. 0798, pp. 56-60, Oct. 14, 1987.

(Continued)

*Primary Examiner* — Jeremy C Norris
(74) *Attorney, Agent, or Firm* — Jason K. Klindtworth

(57) ABSTRACT

A pressure sensing cable in one embodiment includes an optical fiber having a first core and a second core. The first core extends along a length of the cable, and is sized and configured to provide propagation of light along the first core along the length of the cable. The first core has a first mode index corresponding to the speed of light propagation along the first core. The second core extends along the length, is spaced a distance from the first core, and is sized and configured to provide propagation of light along the second core along the length of the cable. The second core has a second mode index corresponding to the speed of light propagation along the second core. The second mode index is different from the first mode index, wherein light propagates along the second core at a different speed than along the first core.

20 Claims, 8 Drawing Sheets

(56) References Cited

U.S. PATENT DOCUMENTS

2010/0189444 A1 7/2010 Vernooy et al.
2012/0234101 A1 9/2012 Vigneaux

OTHER PUBLICATIONS

Shephard et al., "Improved Hollow-Core Photonic Crystal Fiber Design for Delivery of Nanosecond Pulses in Laser Micromachining Applications", Applied Optics, vol. 44, Issue 21, pp. 4582-4588, Jul. 20, 2005.

Knight, "Photonics Crystal Fibers and Fiber Lasers", Optical Society of America, vol. 24, Issue 8, pp. 1661-1668, Jul. 19, 2007.

Jewart et al., "Design of a Highly-Birefringent Microstructured Photonic Crystal Fiber for Pressure Monitoring", Optics Express, vol. 18, Issue 25, pp. 25657-25664, Dec. 6, 2010.

Sulejmani et al., "Control Over the Pressure Sensitivity of Bragg Grating-Based Sensors in Highly Birefringent Microstructured Optical Fibers", Photonics Technology Letters, IEEE, vol. 24, Issue 6, pp. 527-529, Mar. 15, 2012.

Hu et al., "Side-Hole Two-Core Microstructured Optical Fiber for Hydrostatic Pressure Sensing", Applied optics, vol. 51, Issue 20, pp. 4867-4872, Jul. 15, 2012.

Jin et al., "Sensitivity Characteristics of Fabry-Perot Pressure Sensors Based on Hollow-Core Microstructured Fibers", Lightwave Technology, Journal of, vol. 31, Issue 15, pp. 2526-2532, Jun. 17, 2013.

Martynkien et al., "Sensitivity of Birefringent Microstructured Polymer Optical Fiber to Hydrostatic Pressure", Photonics Technology Letters, IEEE, vol. 25, Issue 16, pp. 1562-1565, Jun. 26, 2013.

SYSTEMS AND METHODS FOR DISTRIBUTED PRESSURE SENSING

BACKGROUND

Various devices have been developed for measuring environmental conditions of a given location, such as temperature or pressure. However, numerous locations present challenges to many of these devices. For example, many devices may not be appropriate for use in higher temperature environments, such as geothermal wells, oil wells, or the like.

Certain conventional down-hole sensing techniques (e.g., for oil, gas, or geothermal applications) use distributed strain, temperature, and/or acoustic sensing. Pressure sensing along the length of a cable (or along the depth of a well or hole) may be performed using separately packaged sensors that are spliced along a length of a cable. For example, hydrostatic pressure may be transduced into longitudinal strain along an axis of the sensor, with the longitudinal strain used in determining pressure. However, the process of packaging and splicing sensors along a cable places practical limits on the numbers of pressure sensors along the length of the cable, and accordingly limits the numbers of locations for which pressure may be determined. The splicing of sensors into the cable and/or the use of transduced axial strain increases the cost, complexity, and/or instrumentation of distributed pressure sensing. Conventional approaches may also provide reduced resolution and/or present additional or alternative drawbacks. For example, certain conventional approaches may provide information for limited, discrete locations of a remote environment.

Temperature, strain, and/or acoustics may be measured along the length of an optical fiber by means of Raman, Brillouin, or Rayleigh scattering measurements, with distance resolution down to about one meter along the length of the cable possible. However, distributed pressure measurements (e.g., continuous or nearly continuous measurement of pressure along a length of a cable) may not be able to be made in the same manner.

BRIEF DESCRIPTION

In one embodiment, a pressure sensing cable is provided with an optical fiber that includes a first core and a second core. The first core extends internally along a length of the cable, and is sized and configured to provide propagation of light along the first core along the length of the cable. The first core has a first mode index corresponding to the speed of light propagation along the first core. The second core extends internally along the length of the fiber, is spaced a distance from the first core, and is sized and configured to provide propagation of light along the second core along the length of the fiber. The second core has a second mode index corresponding to the speed of light propagation along the second core. The second mode index is different from the first mode index, wherein light propagates along the second core at a different speed than along the first core.

In another embodiment, a measurement system is provided including a pressure sensing cable, a light source, a detection unit and a processing unit. The pressure sensing cable includes an optical fiber having a transmission core and a reception core. The transmission core extends internally along a length of the fiber, and is sized and configured to provide propagation of light along the transmission core along the length of the fiber. The transmission core has a first mode index corresponding to the speed of light propagation along the transmission core. The reception core extends internally along the length of the cable, is spaced a distance from the transmission core, and is sized and configured to provide propagation of light along the reception core along the length of the fiber. The reception core has a second mode index corresponding to the speed of light propagation along the reception core, the second mode index being different from the first mode index, wherein light propagates along the reception core at a different speed than along the transmission core. The light source is configured to provide light energy to the transmission core, and the detection unit is configured to detect signals from the reception core formed responsive to the light energy in the transmission core. The processing unit is configured to determine a pressure distribution based on the signals from the reception core detected with the detection unit.

In another embodiment, a method for measuring distributed pressure along a length of a cable is provided. The method includes transmitting, via a light source, light energy down a first core of an optical fiber in a pressure sensing cable, the first core having a first mode index corresponding to the speed of light propagation along the first core. The method also includes receiving, via a detector unit, signals from a second core of the pressure sensing cable formed responsive to the transmitting the light energy down the first core. The second core has a second mode index corresponding to the speed of light propagation along the second core that is different from the first mode index, wherein light propagates along the second core at a different speed than along the first core. Further, the method includes determining, using one or more processors, a pressure distribution along a length of the pressure sensing cable based upon the signals received from the second core via the detector unit.

DETAILED DESCRIPTION

Figure 1:
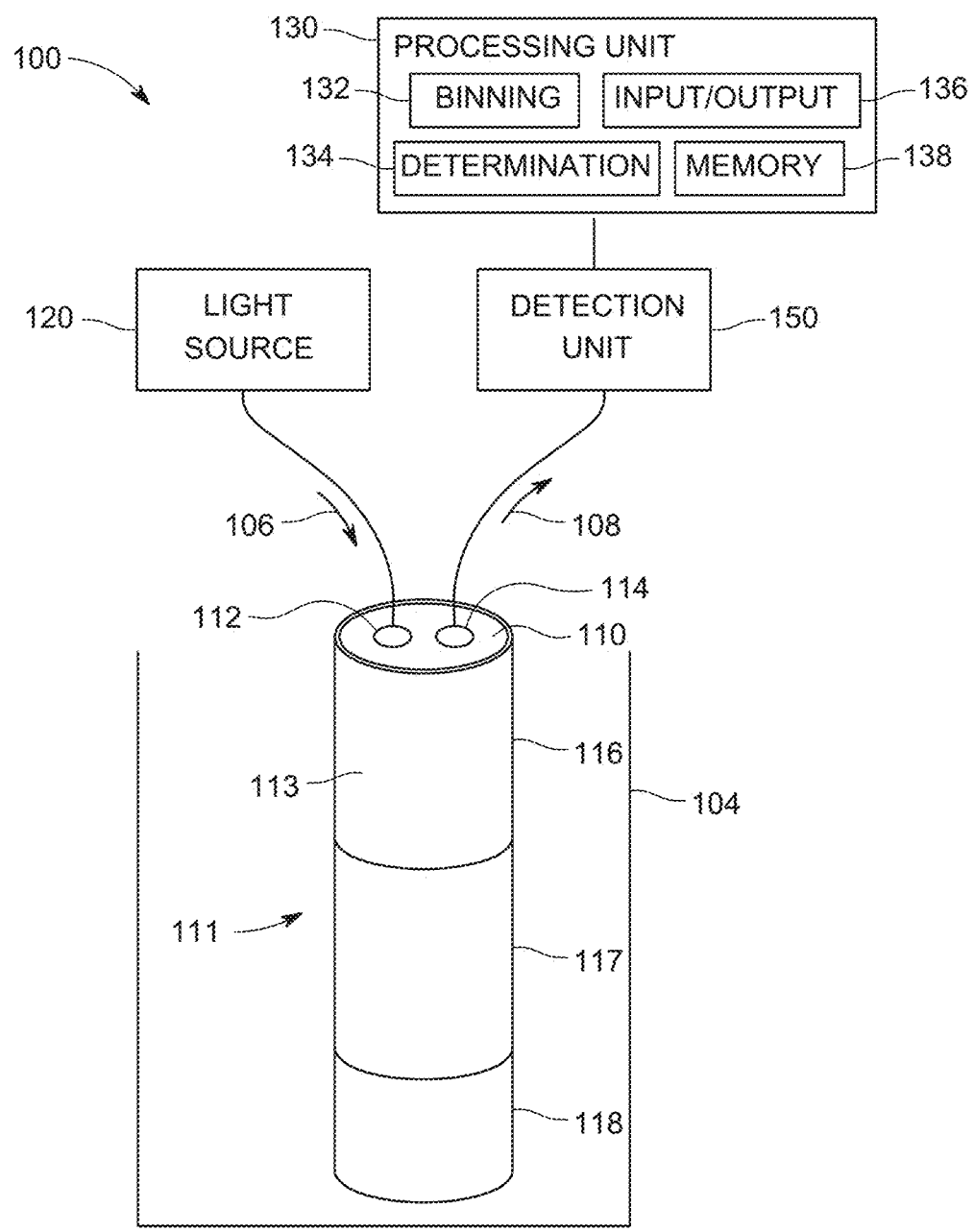
FIG. 1 is a schematic block diagram of a measurement system in accordance with various embodiments.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide for distributed pressure sensing along a seamless, spliceless cable. The cable may include, for example, an optical fiber surrounded by an outer plastic or metal sheath around the fiber. In some embodiments, the cable may include other fibers to measure additional properties, such as temperature, acoustics, or the like. In various embodiments, pressure may be measured continuously or nearly continuously along the length of the cable. By way of example, the length of the cable may be divided into segments, with pressure for each segment determined, in contrast to systems that determine pressure at discrete locations with stretches of cable for which pressure is not determined interposed between the discrete locations. As used herein, continuous distributed pressure sensing may be understood as determining pressures for contiguous or adjacent segments of a cable length, in contrast to discontinuous pressure sensing which may be understood as determining pressures for discrete locations separated by a length of cable for which pressure is not determined. In other embodiments, pressure may be measured or determined only at specific points (e.g., specific points corresponding to the location of recorded Bragg gratings in the fiber. It may be noted that, in embodiments using Bragg gratings, the Bragg gratings recorded in the fiber may connected by stretches of fiber in between the Bragg gratings, but there is no splice in the fiber.

Various embodiments disclosed herein utilize a cable having an optical fiber with multiple cores spaced a lateral distance apart and extending along a length of the cable. The cores, which are configured for the passage of light, are configured to allow light to pass along the cores at different speeds (e.g., the cores are comprised of different materials). Generally, in some embodiments, one core may be configured as a transmission core for the transmission of light (e.g., a pulse of light energy of predetermined duration or length or, as another example, a continuous illumination over a range of wavelengths) into and along the length of the cable, while a different core may be configured as a reception core. Pressure exerted upon the cable along the length of the cable diverts light from the transmission core to the reception core. The amount of light energy diverted to the transmission core at a given position along the length of the cable is proportional to or otherwise corresponds to the pressure exerted upon the cable at the given position. The diverted light energy may travel through the reception core and be detected by a detector coupled to the reception core. If a light pulse is injected into the transmission core, then the time of reception of the light from the reception core corresponds or relates to the location along the cable at which the energy was diverted to the reception core. For example, after a pulse is sent down a transmission core, reflection signals caused by the diversion of energy into the reception core may be received or detected. The reflection signals may be grouped based on time of reception to associate each reflection signal with a location along the length of the cable to which the particular reflection signal corresponds. Then, for each location or segment of the cable, the pressure may be determined using the strength of the signal (or signals) that have been associated with the particular length or segment. For example, in some embodiments, the cable may be separated into contiguous or adjacent segments of about ten meters in length. Pressure for each segment may be determined, so that a continuous distributed pressure measurement having a resolution of about ten meters may be determined along the length of the cable.

In some embodiments, a broad range of wavelengths is injected into the transmission core. When a broad range of wavelengths is continuously injected into the transmission core, then, at specific locations within the optical fiber at which there are Bragg gratings tuned for different wavelengths to couple light from the transmission core into the reception core, light energy is diverted into the reception core at an intensity proportional to the external pressure on the cable at that location. Subsequent measurement of the light intensity exiting the reception core at the wavelength of a particular Bragg grating then provides a measure of the pressure on the cable at the location of that particular grating. In various embodiments, rather than a broad range of wavelengths, the light source may be a tunable laser that scans over the range of wavelengths of the Bragg gratings in the fiber.

At least one technical effect of various embodiments includes providing for the measurement of pressure at various points in a remote location (e.g., a well or down-hole). At least one technical effect of various embodiments includes providing pressure distribution (e.g., continuous pressure distribution) measurement along a length of a cable. At least one technical effect of various embodiments is reduction or elimination of separate packaging and/or splicing of individual sensors to a cable or fiber. At least one technical effect of various embodiments is providing for simplified instrumentation for distributed pressure measurements. At least one technical effect of various embodiments is improved convenience and/or accuracy for pressure readings along a length of a cable (e.g., depth of a well). At least one technical effect of various embodiments includes an increase in sensing locations for a given remote environment or length of cable. At least one technical effect of various embodiments includes integration of pressure measurements with other measurements such as temperature and strain. At least one technical effect of various embodiments includes increased information about interactions between natural and induced fractures in a remote environment, improved understanding of production dynamics of a well, and/or improved understanding of flow and geology of a remote environment, for example for length, width, and/or conductivity of a propped fracture.

FIG. 1 is a schematic view of a measurement system 100 formed in accordance with various embodiments. The measurement system 100 is configured to measure one or more environmental conditions of a remote location 104. In the illustrated embodiment, the measurement system 100 is configured to measure or determine the pressure of the remote location 104. The depicted measurement system 100 is configured to determine a continuous pressure distribution along a length of a cable disposed in the remote location 104. The remote location 104 may be subject to environmental conditions that may be damaging to certain electronic equipment, such as thermocouples. For example, the remote location 104 may be a geothermal well, oil well, or gas well, among others. As one more example, the remote location may be a wellbore used in conjunction with hydraulic fracturing. The remote location 104 depicted in FIG. 1 is shown as having a generally vertical configuration for clarity and ease of illustration; however, for example, in various embodiments, the remote location may also have horizontally oriented portions or volumes. The remote location 104 may be understood as being remote in that the remote location 104 is located at a distance from components of the measurement system 100 configured to generate and/or receive a signal from sensing equipment disposed within the remote location 104. Thus, signal generation and/or signal processing equipment, for example, may be maintained under different environmental conditions than the remote location 104.

The measurement system 100 depicted in FIG. 1 includes a pressure sensing cable 111, a light source 120, a detection unit 150, and a processing unit 130. The light source 120, detection unit 150, and processing unit 130 are operably connected (either directly or indirectly) to the pressure sensing cable 111. The pressure sensing cable 111 includes an optic fiber 110 enclosed within the pressure sensing cable 111. Generally, in various embodiments, the light source 120 is configured to generate light 106 that is transmitted to the optical fiber 110. The light 106, for example, may be an optic signal having a predetermined pulse length or wavelength. The depicted optical fiber 110 is an optical fiber having multiple cores, at least one of which (e.g., the transmission core 112) receives the light 106. The light 106 is transmitted through the optical fiber 110 along the transmission core 112, with a return signal 108 generated within at least one additional core (e.g., reception core 114) of the optical fiber 110 responsive to the light 106 (e.g., light energy from the transmission core may be diverted via crosstalk to the reception core, with more or less light energy diverted as pressure increases). Based on a time of reception (e.g., a time relative to an initial sending of the light 106, a reception of a reflection of the light 106 via the transmission core, or other point in time) or wavelength, the location along the length of the pressure sensing cable 111 to which a portion of the return signal 108 corresponds may be determined. The processing unit 130 is configured to obtain (e.g., receive) the return signal 108, for example via the detection unit 150. The processing unit 130 is also configured to identify the portions of the return signal 108 associated with particular locations along the pressure sensing cable 111 based on time of reception or detection or wavelength, and determine a pressure for each particular location based on the corresponding identified portion of the return signal 108. In the illustrated embodiment, the pressure sensing cable 111 is shown disposed vertically within the remote location 104, while the light source 120 and the processing unit 130 are disposed at a distance from the remote location 104. Thus, only the pressure sensing cable 111 is subject to the environmental conditions of the remote location 104, while the light source 120 and the processing unit 130 are not.

The depicted optical fiber 110 includes an optical fiber with a transmission core 112 and a reception core 114. The pressure sensing cable 111 includes a protective sheath 113 that surrounds the optical fiber 110 along the length of the optical fiber 110. As used herein, a core of an optical fiber is configured to provide a path or passageway for the transmission of light energy along the length of the optical fiber. A core of an optical fiber may be understood as a member that extends along a length of the optical fiber, and that is adapted or configured for the passage of light therethrough along the length. A core may be referred to herein as a waveguide. A core may be made of a solid material, or may be formed using an opening that contains air. Depending on the material used and/or the length of the optic fiber along which the core runs, the core may require a sufficient cross-sectional area to allow the passage of light. For example, certain optic fibers may include a number of relative small cross-section openings (e.g., surrounding a core) that are not large enough for the efficient or practical passage of light along the length of the optic fiber. For purposes of clarity and the avoidance of doubt, such openings that are not large enough for the practical or efficient passage of light along the length of an optic fiber are not cores. Thus, the size of an opening may substantially prevent the opening from operating as a core or providing sufficient propagation of light to be a core. As used herein, substantially preventing the propagation of light along the length of a cable may be understood as preventing or not providing an efficient, effective, or useful amount of light to be transmitted along the length of the cable. For example, in some embodiments, an optical fiber may have length of about one kilometer or more, and openings having a diameter of about 0.4 micrometers or less may be too small to provide an efficient, effective, or useful amount of light to be transmitted along their length and may be understood as not being cores.

Further, a core of an optical fiber as used herein is configured to receive light from an outside source and/or to provide light to an outside detector or collector. For purposes of clarity and the avoidance of doubt, such openings not configured to receive light from an outside source or provide light to an outside recipient are not cores. For example, relatively large openings may be utilized in various fibers to provide compressibility; however, if the openings are not adapted to receive or provide light as discussed herein, such openings are not cores.

The depicted pressure sensing cable 111 includes a first segment 116, a second segment 117, and a third segment 118, which are contiguously positioned along the length of pressure sensing cable 111. Pressure may be determined for each segment to provide a continuous pressure distribution along the length of the pressure sensing cable 111. It may be noted that the particular arrangement of FIG. 1 is schematic in nature and provided for illustrative purposes only, and that other arrangements may be utilized in practice. For example, the pressure sensing cable 111 may be about 1 kilometer or more long, and the segments may be, in various embodiments, about 1 meter long, about 5 meters long, or about 10 meters long, among others. Thus, for example, pressure may be determined for each of a plurality of segments having a length of about 1 meter along the length of a cable, with a continuous pressure distribution provided with a resolution of about 1 meter. Further, while two cores are shown in FIG. 1, additional cores may be present in various embodiments.

It may be noted that the cores in the illustrated embodiment are configured so that the speed of light passing through each of the cores is different. For example, a first core (e.g., transmission core 112) may have a first mode index and a second core (e.g., reception core 114) may have a different, second mode index. As used herein, the mode index of a core corresponds to the speed of light through the core. The higher the mode index of a core, the lower the speed of light through the core.

Figure 2:
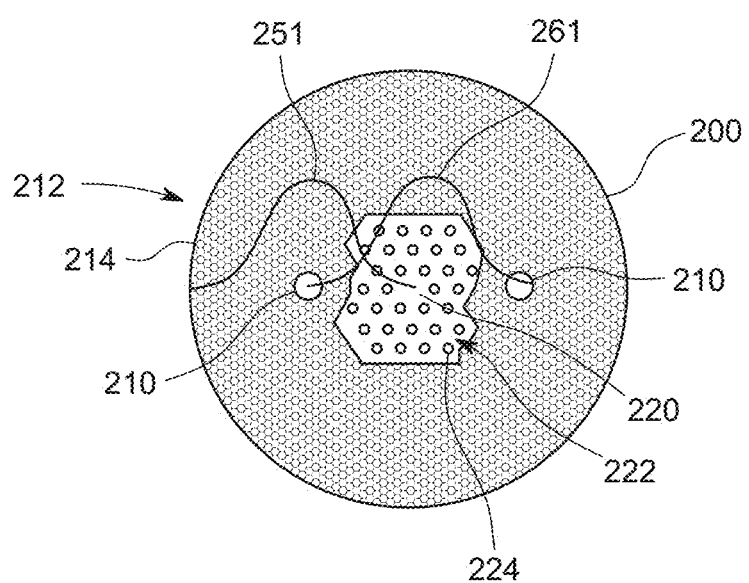
FIG. 2 is a schematic cross-sectional diagram of a sensing cable in accordance with various embodiments.

Cores may be formed using a variety of techniques or structures. FIG. 2 illustrates a cross-section of a fiber 200 having cores of different construction. The fiber 200 includes two first cores 210 disposed on opposite sides of a second core 220. The two first cores 210 may be configured as hollow or air cores, while the second core 220 may be configured as a solid core. In the illustrated embodiment, one or both of the two first cores 210 may be configured as a transmission core, and the second core 220 may be configured as a reception core.

In some microstructured fibers, a solid core is surrounded by a periodic array of holes or openings that generate a lower effective index around the center in order to confine the light in the core. The second core 220 in the illustrated embodiment is formed as a solid core surrounded by an array 222 of openings 224. It may be noted that the openings 224 are not configured for the passage of light therethrough and are not cores as used herein.

In another type of fiber, a periodic hole array may surround a hollow core. The outer array of holes may form a photonic crystal of high reflectivity to confine the light inside the hollow central core of the fiber. A hollow core formed in this manner may be particularly well-suited for carrying high laser power, as most of the light energy is located within the hollow core rather than within glass forming other portions of the fiber. Further, a hollow core may be designed for zero or near zero dispersion at a specific wavelength so that narrow pulses do not significantly broaden during propagation. Accordingly, hollow cores may be particularly appropriate for carrying short, high power optical pulses, such as the light 106. The first cores 210 in the illustrated embodiment are formed as hollow cores surrounded by an array 212 of openings 214. It may be noted that the openings 214 are not configured for the passage of light therethrough and are not cores as used herein.

As seen in FIG. 2, the fiber 200 includes three cores—namely, two first cores 210 (e.g., hollow cores) disposed on opposing sides of a single second core 220 (e.g., a solid core). While only one first core 210 and one second core 220 may be required for sending and receiving signals in various embodiments (e.g., one transmission core and one reception core), use of two first cores 210 may be employed to provide axial symmetry, for example, for improved manufacture. To utilize the fiber 200, a narrow, high power pulse of light (e.g., light 106) may be injected into one of the first cores 210. As the pulse propagates along the first core 210 into which the pulse was injected, a slight overlap between the mode profile 251 of the first core 210 into which the pulse was injected and the mode profile 261 of the second core 220 results in light being diverted from the first core 210 to the second core 220 via cross talk between the cores. The amount of light transferred may be relatively small. For example, for a 10 kilometer fiber, if 90% of injected light is transmitted through a hollow core to the end of the hollow core, the cross talk (e.g., a nominal or base amount of cross talk in the absence of pressure or at a standard or reference pressure) is about 1%/kilometer or about −20 dB/kilometer in some embodiments. In contrast, in telecommunication applications, it may be undesirable to have cross talk between neighboring cores, because the cross talk may cause signal distortion. Accordingly, typical multi-core telecommunications fiber has relatively lower cross talk levels, for example, −40 dB/kilometer or less. For the fiber 200, however, because the transfer of light from the first core 210 to the second core 220 is utilized to determine pressure, at least a minimum amount of effective cross talk is required so that the return signal (e.g., the signal resulting from cross talk) may be sufficiently strong to be utilized in determining pressure. However, if too much light is transferred (or cross talk is at too high of a level), the light transferred from the first core 210 to the second core 220 may in turn be transferred back from the second core 220 to the first core 210, which both reduces the signal in the second core 220 (e.g., the return signal 108 that may be used to determine pressure) and distorts the amount of light in the first core 210. Accordingly, the fiber 200 may be configured (e.g., the size, material, and placement of the cores may be configured) to optimize or provide an acceptable level of cross talk between the cores to provide a sufficiently large signal for use in determining pressure while eliminating, minimizing, or reducing to an acceptable level the amount of reverse cross talk (or transfer of light from the second core 220 (e.g., the reception core) to the first core 210 (e.g., the transmission core)).

As mentioned above, the mode indices (or speed of light through the cores) are different for the first core 210 (or transmission core) and the second core 220 (or reception core). For example, the mode index for the first core 210 (which is hollow) may be about 1. In contrast, the second core 220 may be made of a solid material such as fused silica and have a mode index of about 1.5 (e.g., about 1.48). The speed of light travelling in a waveguide or core is given by the ratio of the speed of light in a vacuum to the mode index of the waveguide or core. Light propagates about 50% faster down a hollow core or waveguide than down a solid core or waveguide having a mode index of about 1.5. The difference in speed of light along the cores may be used to determine the location at which a particular portion of a signal is transferred (e.g., due to pressure on the cable) from a transmission core to a reception core. The amount of pressure for a portion of the return signal (and, accordingly for the location along the cable corresponding to the portion of the signal) may be determined based on the amount of cross talk, which may be represented by the strength of the portion of the return signal. Generally, the greater the pressure on a location along a cable, the greater the cross talk, and, accordingly, the greater the strength of the portion of the return signal associated with the location along the cable. (It may be noted, however, that in alternate embodiments, a fiber could be designed so that an increase in pressure resulted in a decrease in cross-talk.) The particular relationship used to determine pressure based on strength of return signal may be empirically measured, determined, or calibrated for a given cable, and used by the processing unit 130 to determine pressure based on the return signal 108.

Figure 3:
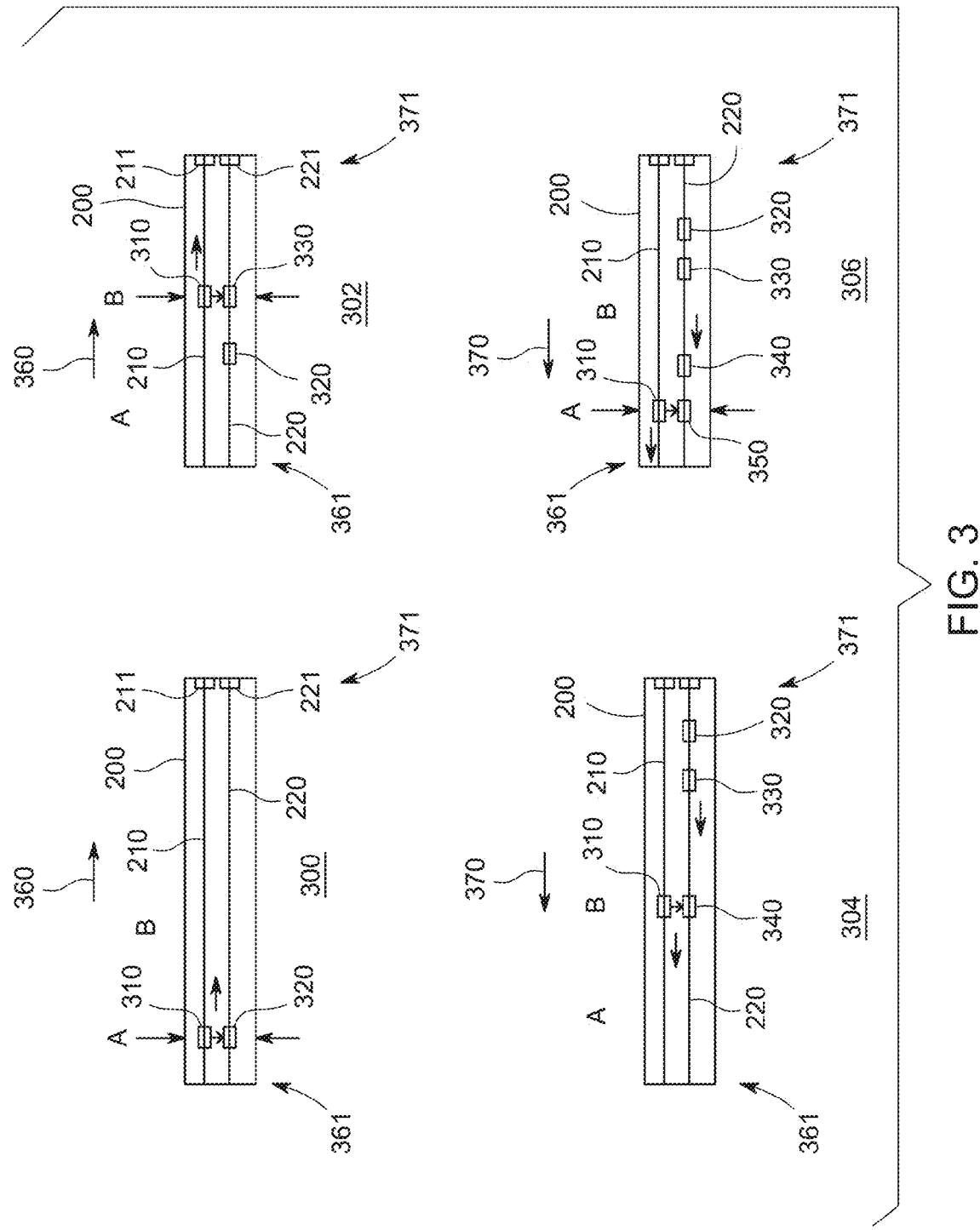
FIG. 3 illustrates propagation of signals along cores of a pressure sensing cable in accordance with various embodiments.

FIG. 3 illustrates the propagation of light along the cores of a fiber at different times, namely a first time 300, a second time 302, a third time 304, and a fourth time 306. Light signals are shown propagating along the first core 210 into which a light pulse (e.g., light 106) is transmitted and the second core 220 which receives light energy diverted from the first core 210 under the influence of external pressure at points A and B. In the illustrated embodiment, for clarity, external pressure and cross talk induced signals are shown only for points A and B; however, it may be noted that a given signal may correspond to a range of points (e.g., a given signal may correspond to the signal for a range of the fiber 200, such as a segment), and that signals for additional points or ranges may be present.

At an initial time (before the times shown in FIG. 3), a light pulse is introduced into the first core 210 of the fiber 200. The light pulse is represented by box 310 in FIG. 3. At the first time 300, as the light pulse 310 propagates along the fiber 200 (to the right in an injection direction 360 as seen in FIG. 3), the light pulse 310 arrives at location A, and is subject to an external pressure. As a result, a portion of the light pulse 310 is transmitted to the second core 220 as a first return signal portion 320. The greater the pressure at location A, the stronger the first return signal portion 320 will be. It may be noted that the percentage of the light pulse 310 that is transferred to the second core 220 as the first return signal portion 320 may be relatively small. For example, the amount of light transferred may be on the order of about 0.1% in some embodiments. After the light pulse 310 passes location A, both the light pulse and the first return signal portion 320 continue traveling toward the right as seen in FIG. 3 toward location B. However, because the mode index for the first core 210 is lower than the mode index for the second core 220, the light pulse 310 travels toward location B at a greater speed than does the first return signal portion 320.

At the second time 302, the light pulse 310 has arrived at location B, and a portion of the light pulse 310 is transmitted to the second core 220 as a second return signal portion 330. The strength of the second return signal portion 330 corresponds to the external pressure exerted upon the fiber 200 at location B. The higher the external pressure at location B, the stronger the second return signal portion 330 will be. As seen in FIG. 3, the first return signal portion 320 has not yet arrived at location B because the light pulse 310 is traveling faster through the first core 210 than the first return signal portion 320 is traveling through the second core 220. Accordingly, the second return signal portion 330, although diverted or transferred to the second core 220 at a later time than the first return signal portion 320, is in front of or ahead of the first return signal portion 320 in the direction of travel. After time 302, the light pulse 310, the second return signal portion 320, and the first return signal portion 320 continue traveling toward the right as seen in FIG. 3, with the light pulse 310 traveling faster through the first core 210 than the second return signal portion 330 and the first return signal portion 320 travel through the second core 220. As seen in FIG. 3, a first mirror 211 is disposed at an end of the first core 210, and acts to reflect the light pulse 310 (e.g., to the left in a return direction 370 as seen in FIG. 3). Also, a second mirror 221 is disposed at an end of the second core 220, and acts to reflect the second return signal portion 330 and the first return signal portion 320 (e.g., to the left as seen in FIG. 3). Thus, the light pulse 310 may travel in an injection direction 360 from the light source to the first mirror 211, and then return in a return direction 370. Return signal portions may be generated as the light pulse travels in the return direction 370 as well as the injection direction 360. Return signal portions generated while the light pulse 310 travels in the injection direction 360 are reflected by the second mirror 221 toward a detector, and return signal portions generated while the light pulse 310 travels in the return direction 370 travel directly (e.g., without reflection) to the detector. The fiber 200 may be understood as having an injection end 361 and a reflection end or return end 371. It may be noted that in some embodiments, instead of a mirror at the end of a core, a loop may route light from a given core to an additional core for return in a direction toward the light source. For example, a loop may join the two first cores 210 shown in FIG. 2, such that light is sent along the fiber in one direction along one of the first cores 210 and returned in an opposite direction along the other of the first cores 210.

At the third time 304, the light pulse 310 has reflected off of the mirror 211 and traveled toward the left as seen in FIG. 3 to arrive again at location B. The second return signal 330 and the first return signal 320 have reflected off of the mirror 221, but have not arrived at the location B because the light pulse 310 is traveling faster due to the lower mode index of the first core 210 relative to the second core 220. Once again, a portion of the light pulse 310 is transmitted to the second core 220, this time as third return signal portion 340, with the strength of the third return signal portion 330 corresponding to the external pressure exerted upon the fiber 200 at location B. After the light pulse 310 passes location B, the light pulse 310, as well as the third return signal portion 340, the second return signal portion 330, and the first return signal portion 320 continue traveling toward the left as seen in FIG. 3 toward location A. Again, because the mode index for the first core 210 is lower than the mode index for the second core 220, the light pulse 310 travels toward location B at a greater speed than does the first return signal portion 320, second return signal portion 330, and third return signal portion 340. Also, as seen in FIG. 3 at time 304, the third return signal portion 340, although diverted or transferred to the second core 220 at a later time than the first return signal portion 320 and the second return signal portion 330, is in front of or ahead of the first return signal portion 320 and the second return signal portion 330 in the direction of travel.

At the fourth time 306, the light pulse 310 has passed location B and traveled to the left to arrive again at location A. The third return signal 340, the second return signal 330, and the first return signal 320 have also traveled to the left since the third time 304, but have not arrived at the location A because the light pulse 310 is traveling faster due to the lower mode index of the first core 210 relative to the second core 220. Once again, a portion of the light pulse 310 is transmitted to the second core 220, this time as fourth return signal portion 350, with the strength of the fourth return signal portion 350 corresponding to the external pressure exerted upon the fiber 200 at location A. Because both the fourth return signal portion 350 and the first return signal portion 320 have been transferred at location A, and because the pressure at location A will be similar at both first time 300 and fourth time 306 (assuming the fiber 200 is relatively short relative to the speed of light through the fiber 200), the strength of the fourth return signal portion 350 and the first return signal portion 310 will be similar. After the light pulse 310 passes location A, the light pulse 310, as well as the fourth return signal portion 350, third return signal portion 340, the second return signal portion 330, and the first return signal portion 320 continue traveling toward the left as seen in FIG. 3 beyond location A. For example, the signals may travel to one or more detection units operably coupled to the cores at the end of the fiber 200 into which the light pulse 310 was originally injected. The signals will arrive at the detection unit(s) at different times based on the time of generation of the signals and the speed of the signals through the cores. For example, the reflected light pulse 310, travelling through the first core 210 will arrive first. Of the return signal portions, the fourth return signal portion 350, which travels the lowest amount through the second core 220, will arrive at the detector first, followed by the third return signal portion 340, which is followed by the second return signal portion 330, which is in turn followed by the first return signal portion 320.

Figure 4:
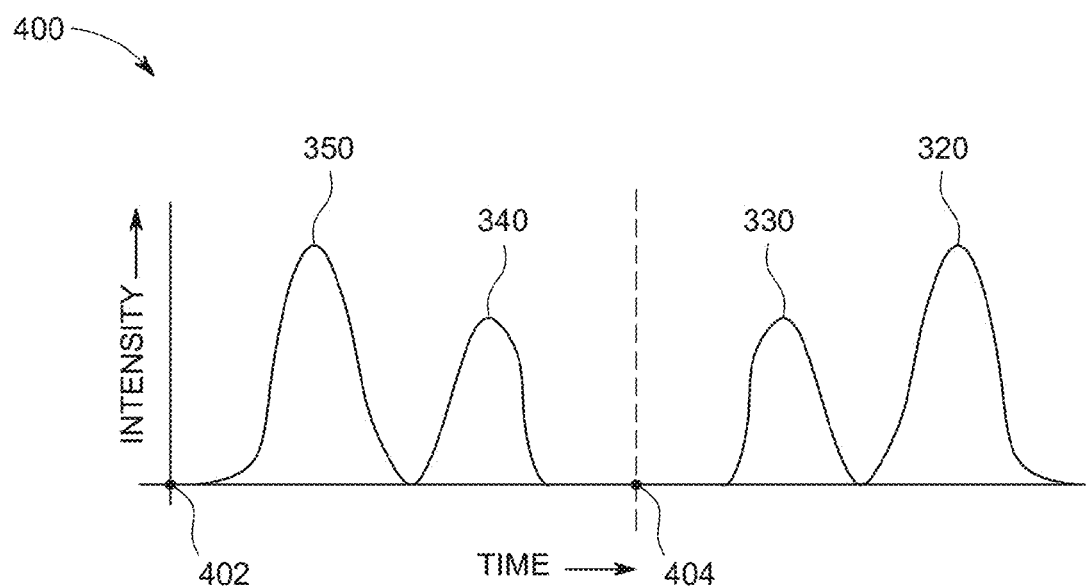
FIG. 4 is a graph of detected signals depicted in FIG. 3.

FIG. 4 illustrates the return signal portions plotted along a horizontal axis of arrival time at a detection unit. An initial or trigger time is indicated at 402. The trigger time 402 may be initiated at a time of reception or detection of the light pulse 310 at a detection unit. For example, a detection unit may be operably coupled to the first core 210 through which the reflected or returned light pulse 310 travels in the return direction to the end of the fiber 200 at which the light pulse 310 was injected. As the light pulse 310 has remained in the first core 210 (or transmission core) through which light travels faster than the second core 220 (or reception core), the light pulse 310 will arrive at an injection end (e.g., the end at which the light pulse 310 is injected into the fiber 200) before any of the return signal portions formed or generated by cross talk during the travel of the light pulse 310 through the first core 210. Reception of the light pulse 310 may be used as a trigger to begin sampling the second core 220 for return signal portions, or used as a reference time for determining the locations along the cable length that correspond to the various return signal portions.

As seen in FIG. 4, the fourth return signal portion 350 is detected first, followed by the third return signal portion 340, followed by the second return signal portion 320, which is followed by the first return signal portion 310. Again, the first return signal portion 320 and the fourth return signal portion 350 correspond to the pressure at location A, and the second return signal portion 330 and the third return portion 340 correspond to the pressure at location B. In the illustrated embodiment, the pressure at location A is greater than the pressure at location B, as the amplitude of the first return signal portion 320 and the fourth return signal portion 350 is greater than the amplitude of the second return signal portion 330 and the third return signal portion 340. The particular relationship between the pressure at a given location and the amplitude of the corresponding return signal portion(s) may be determined empirically, for example as part of a calibration process for a cable.

The amplitudes of return signals corresponding to the same location may be expected to be similar due to the short difference in time between the passage of the light pulse 310 past the given location in the injection direction and the passage of the light pulse 310 past the given location in the return direction. Accordingly, for a given location, the amplitudes of the corresponding signals (one generated in the injection direction and one generated in the return direction) may be added, averaged, or otherwise combined to provide a combined amplitude or signal that is used to determine the pressure for the given location. Additionally or alternatively, the amplitudes of the corresponding signal portions for the different directions for the same location may be compared, and if the signal portions differ by more than a threshold amount, the signals may be identified as of questionable reliability and/or discarded. Further, for a given location, the signals for a corresponding location for plural pulse signals sent sequentially (e.g., a subsequent pulse signal may be transmitted after detection of the returned previous pulse signal) may be averaged to determine pressure for the given location.

As seen in FIG. 4, the various return signal portions are symmetric about an intermediate time 404. The intermediate time 404 may correspond to a time of arrival of the pulse signal 310 at a mirror at which the pulse signal 310 is reflected from the injection direction 360 to the return direction 370. The signal portions to the right of the intermediate time 404 correspond to signals generated during the travel of the pulse signal 310 in the injection direction 360, with the signal portions associated with locations closer to the mirror being closer to the center of the graph of FIG. 4. Similarly, the signal portions to the left of the intermediate time 404 correspond to signals generated during the travel of the pulse signal 310 in the return direction 370, with the signal portions associated with locations closer to the mirror being closer to the center of the graph of FIG. 4. The locations farthest from the mirror, or closest to the end at which the light pulse 310 is injected, are closer toward the right (and left) edges of the graph of FIG. 4. Accordingly, a series of measurement positions (e.g., cable segments) may be defined along a length of the cable, and each measurement position assigned a bin into which return signal portions formed at the measurement position are grouped or stored. In various embodiments, location A may correspond to first chamber or segment and location B may correspond to a second chamber or segment, with location A being located closer to the injection end 361 than location B. The return signal portions thus may be grouped into bins based on time of detection, with time of detection corresponding to the measurement position (or segment) along the length of the cable. In some embodiments, each measurement position may correspond to two detection time periods disposed symmetrically about an intermediate time (e.g., intermediate time 404), and each bin may include two portions of signals detected (e.g., one portion to the left of the intermediate time 404 and one portion equally spaced to the right of the intermediate time 404).

Accordingly, based on the time of detection, the various signal portions may be binned or grouped into time periods corresponding to particular locations along the cable. For example, each segment of a cable may have a bin associated therewith, and those return signal portions detected in a time period associated with the longitudinal position of the segment along the length placed in the associated bin. For each segment, the return signal portion(s) in the associated bin may then be used to determine pressure for the corresponding segment (e.g., based on the amplitude of the signal portion(s) in the bin.

It may be noted that the example scenario of FIGS. 3 and 4 is presented for illustrative purposes. In various embodiments, rather than a series of return signal portions as shown in FIG. 4, a relatively long, drawn out return pulse from the cross talk coupling along the length (e.g., the entire length) of the cable may be expected. The pulse that is received by the second core 220 (or reception core) may begin at the same instant as the pulse in the first core 210 (or transmission core) reaches the front end (or injection end) of the fiber. The pulse from the second core 220, however, does not end until the passage of a time $\Delta T$. (The end of a pulse may be understood as the time of the last detection of a portion of the pulse.) $\Delta T$ may be expressed by the following: $\Delta T=(2L*(n-1))/c$, where L is the length of the fiber, n is the mode index of the reception core, and c is the speed of light. For example, for a cable having a length of about 10 kilometers, and a mode index of about 1.5, the length of the pulse through the reception core is about 33 microseconds. If the pulse is binned into intervals of about 1 nanosecond duration (e.g., using a fast detector), there will be about $3.3 \times 10^4$ bins for the 20 kilometer round trip, or about 0.6 meters per bin. The resolution along the fiber may be represented by $\delta d=2L/(\Delta T/\Delta t)=\Delta t*c/(n-1)$, where $\Delta t$ is the detection time interval. The detection time interval or sampling rate may be selected or designed to provide a duration or bin size that corresponds to the length of the segments of a cable. As fast detectors are readily available, length resolutions of about 1 meter along the length of the cable (e.g., allowing segment lengths of about 1 meter or determination of pressure at 1 meter intervals along the length of a cable) may be attained. A relatively narrow injected light pulse may be used to achieve a desired resolution.

As illustrated in FIGS. 3 and 4, by using cores having different speeds of light or optic signals therethrough (e.g., a transmission core having a lower mode index and a reception core having a higher mode index), the portions of a return signal may be associated with corresponding particular locations (e.g., ranges or segments of a cable) along the length of the cable based on time of reception of the portions.

The preceding discussion regarding the use of crosstalk between cores transferring light from the transmission core to the reception core utilizes minute imperfections in the optical fiber to provide the crosstalk coupling. In particular, in order to transfer light from one core to another, both the energy and momentum of the photon must be conserved. The frequency or free space wavelength of a photon determines its energy, and because the frequency does not change when the photon transfers from one core to the other, energy is automatically conserved in crosstalk coupling. However, because the wavevector of the photon, which is a measure of its momentum, is directly proportional to the mode index, and because the fiber is specifically designed so that the mode index is substantially different for the two cores, crosstalk between cores will not conserve momentum of the photon and hence there may be very little crosstalk unless there is a mechanism in the fiber for changing the wavevector of the photon. Any imperfections in the fiber may supply the required momentum correction. In practice, there are generally such imperfections resulting from the fiber drawing process. However, if the crosstalk coupling cannot be made large enough to reach the ~1%/km level by way of fiber imperfections, it is also possible to deliberately introduce "imperfections" into the fiber, for example, by recording Bragg gratings at specific locations along the fiber. Specifically, a grating is recorded in one core with a period that introduces the proper amount of momentum change to efficiently couple the photon from one core to the other. The wavevector matching condition is $$k_2 = \frac{2\pi n_2}{\lambda_0} = k_1 \pm \frac{2\pi}{g} = \frac{2\pi n_1}{\lambda_0} \pm \frac{2\pi}{g}$$

where $k_1$ ($k_2$) is the wavevector of the photon in core 1 (core 2), respectively, $n_1$ ($n_2$) is the mode index in core 1 (core 2), respectively, $\lambda_0$ is the free space wavelength, and g is the period of the Bragg grating. One advantage of this approach is that the strength of the Bragg gratings may be relatively easily adjusted to provide the proper degree of crosstalk coupling. The grating coupling strength can be orders of magnitude greater than the coupling provided by imperfections in the fiber resulting from fiber drawing. Another advantage of this approach is that, when the photon is coupled into the reception core, the grating can be specifically designed so that the coupled photon will propagate in the reverse direction, back towards the surface. Therefore, the photon does not need to make a round trip through the fiber and a relatively smaller difference in the mode index between the two cores may be utilized to determine the location of a pulse reflection in the fiber. Furthermore, both cores may be configured as solid cores with only slightly differing mode indices. In this case, the mode indices only need to be sufficiently different between cores such that the Bragg grating in one core does not interfere with the light propagating within that core. If the Bragg grating is designed with a grating period according to the previous equation to couple light with free space wavelength $\lambda_0$ from a core with index $n_1$ into a core with index $n_2$, then the free space wavelength for the center of the reflection band of light in core 2 differs from $\lambda_0$ by $\Delta\lambda$, where $$\Delta\lambda = \left(\frac{n_2 - n_1}{n_2 + n_1}\right)\lambda_0 = \left(\frac{\Delta n}{2n_1 + \Delta n}\right)\lambda_0.$$

For example, a fiber Bragg grating has a typical reflection band $\Delta\lambda \sim 1$ nm. If the difference in mode indices between the two cores is $\Delta n$, and a desired reflection band of the Bragg grating in a second core is to be ($3\Delta\lambda$) away from the wavelength which couples light from the first core to the second core, so that there is no interference from the grating with the light once it has coupled into the second core, then for $\lambda=1.55$ µm and for a solid core 1 with $n_1=1.48$, the second core may have an index of $n_2$ that is at least $$n_2 \geq n_1 + \Delta n = n_1 + \frac{2n_1 \Delta\lambda}{\lambda_0 - \Delta\lambda} = 1.48574,$$

which can be achieved through appropriate doping of the solid second core with an element like Ge to raise the mode index of the second core above that of the first core. A third advantage of using Bragg gratings to couple light between cores is that different gratings can be designed to couple at different wavelengths, so that the location of the crosstalk can be selected by wavelength rather than by time of pulse return. Pulse timing is therefore not essential with this approach, while still providing a spliceless cable. However, the quasi-continuous nature of the crosstalk coupling from fiber imperfections may be no longer possible when using Bragg gratings. Further, an additional step in fiber manufacture to record the gratings may be required.

Figure 5:
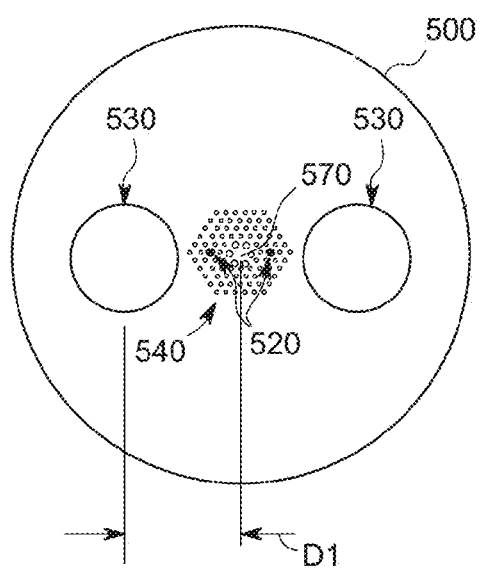
FIG. 5 is a schematic cross-sectional view of a pressure sensing cable in accordance with various embodiments.
Figure 6:
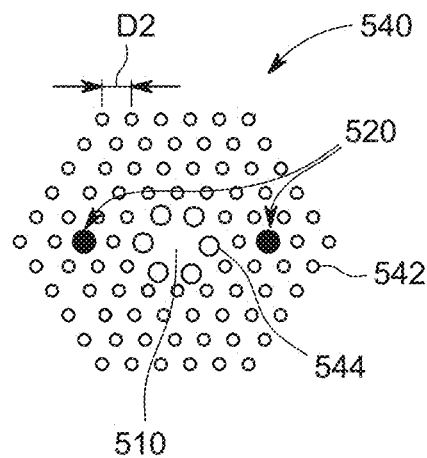
FIG. 6 is a view of a central portion of the cable of FIG. 5.
Figure 7:
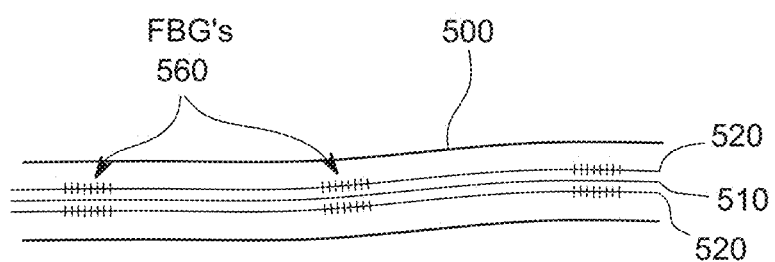
FIG. 7 is a side view of the cable of FIG. 5.

Other core arrangements may be utilized in various embodiments. For example, FIG. 5 illustrates a cross-section view of a fiber 500 having differently configured solid cores without any hollow cores, FIG. 6 illustrates a cross-section of a central portion of the fiber 500, and FIG. 7 illustrates a side view of the fiber 500. As seen in FIG. 5, the fiber 500 includes a first core 510, two second cores 520, two side holes 530, and an array of holes 540. The first core 510, for example, may be formed from a central portion of pure silica used to form the bulk of the fiber 500, with the central portion surrounded by holes of the array 540 to define the first core 510. The second cores 520, for example, may be made of doped silica. In some embodiments, the second cores 520 may be formed of Germanium Oxide (GeO₂) doped silica. For instance, the second cores 520 may be made of 13.5% Ge-doped silica. The side holes 530 are relatively large, open structures passing along the length of the fiber 500. The side holes 530 may be provided to provide stress anisotropy and/or compressibility to the fiber 500. In some embodiments, the overall diameter of the fiber 500 may be about 125 micrometers, with the side holes 530 having a diameter of about 40 micrometers and being positioned a distance D1 of about 30.5 micrometers from the center of the fiber 500 (e.g., from the center of the first core 510). The second cores 520 may have a diameter of about 0.633 micrometers. It may be noted that the side holes 530 and the holes of the array 540 are not configured to receive or transmit light and/or are inappropriately sized for the transmission of light therethrough, and are not cores as the term is used herein.

As best seen in FIG. 6 (which illustrates a center region of the fiber 500), the array 540 may include a group of first holes 544 that immediately surround the first core 510, or are adjacent to or bounding the first core 510. The array 540 may also include a group of second holes 542 that are placed radially outward of the first holes 544 and surround the second cores 510. The first holes 544 may be larger than the second holes 542. For example, the first holes 544 may have a diameter of about 0.396 micrometers and the second holes 542 may have a diameter of about 0.316 micrometers. The second holes 542 may be arranged in staggered rows as shown having a pitch D2 of about 0.633 micrometers (e.g., the pitch D2 may be the same or about the same as the diameter of the second cores 520 which the second holes 542 surround).

As indicated herein, a slight overlap between the mode profile of a first core and a second core may be utilized to divert light from the first core to the second core. In some embodiments, Fiber Bragg Gratings (FBGs) may be provided in a core to help couple light between cores, as also discussed above. A FBG may be understood as a type of reflector formed in an optic fiber that reflects certain wavelengths and transmits other wavelengths. A FBG may be formed by creating variations in the refractive index of a fiber (e.g., in the fiber core), for example using an ultraviolet (UV) laser on a photosensitive fiber. For example, as seen in FIG. 7, the second cores 520 may have FBGs 560 disposed along the length of the second cores 520 along the length of the fiber 500, with the FBGs 560 disposed at the intersections or joining points of individual segments of the fiber 500 (e.g., individual segments for which pressure will be determined independently of other segments). In addition to helping couple light from the first core 510 to the second cores 520, the FBGs may also be used to help reflect light along the second cores 520, which may be used to identify the timing of signal portions associated with each segment. If the signal portions are reflected using FBGs at the end of each segment instead of a mirror at the end of a reception core, the earlier formed return signal portions generated as a light pulse travels in the injection direction may be received by a detector before the later formed return signal portions generated as the light pulse travels in the injection direction.

Figure 8:
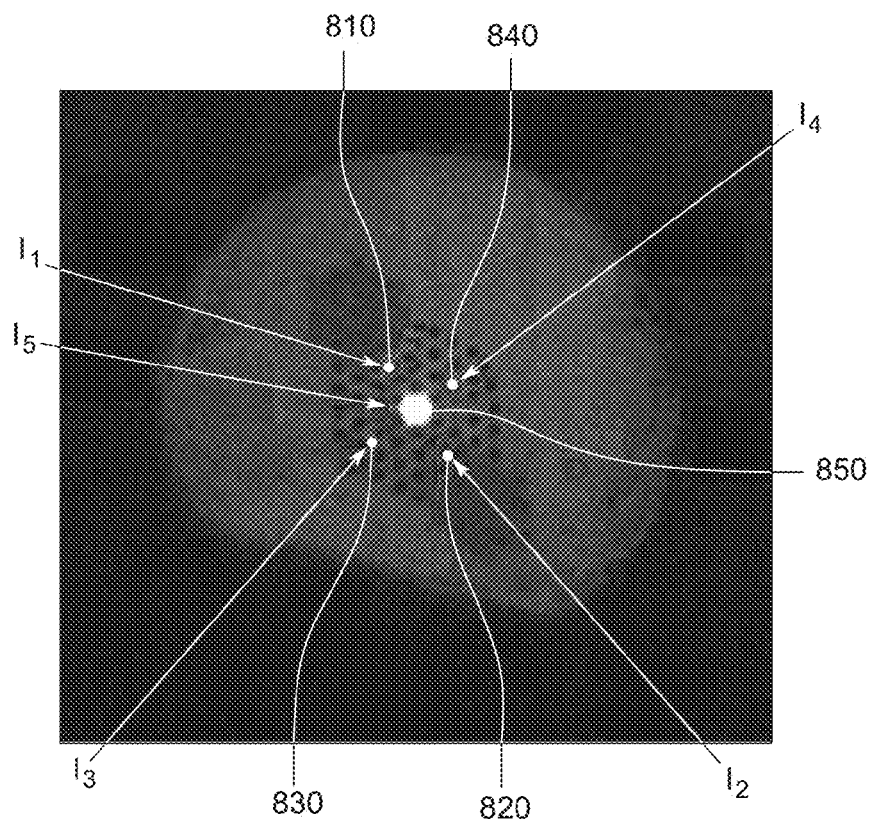
FIG. 8 is a schematic cross-sectional view of a pressure sensing cable in accordance with various embodiments.

FIG. 8 illustrates an additional example of a cable having plural solid cores. FIG. 8 illustrates a cross-sectional view of a fiber 800 having differently configured solid cores. In FIG. 8, a central core 850 (which may be similar to first core 510) is surrounded radially by a first radial core 810, a second radial core 820, a third radial core 830, and a fourth radial core 840. Various properties, including pressure, temperature, and strain, may be determined using a measured property, such as intensity of a signal, for each core. Again, the signal portions may be associated with positions along the length of the fiber 800 based on a time of reception. The central core 850 in the illustrated embodiment has a different mode index than the radial cores.

The intensities (or other measured property) of the various cores may be combined to determine various properties along the length of the fiber 800. For example, in some embodiments, pressure may be proportional to $((I1+I2)-(I3+I4))/I5$, where I1 is the intensity of a signal of the first radial core 810, I2 is the intensity of a signal of the second radial core 820, I3 is the intensity of a signal of the third radial core 830, I4 is the intensity of a signal of the fourth radial core 840, and I5 is the intensity of a signal of the central core 850. As another example, in some embodiments, temperature may be proportional to $((I1+I2)+(I3+I4))/I5$. As one more example, in some embodiments, strain may be proportional to $((I1-I2)+(I3-I4))/I5$. The particular proportionalities or relationships used may be determined experimentally, for example as part of a calibration of the fiber 800.

Returning to FIG. 1, the pressure sensing cable 111 includes segments 116, 117, 118. Portions of signals may be grouped and associated with the segments, so that a pressure may be determined independently for each segment, with the segment length defining the resolution of the pressure distribution measurement. In some embodiments, the pressure sensing cable 111 may have a length of about 10 kilometers separated into segments having individual lengths of about 1 meter, with the length resolution of the pressure measurements being about 1 meter.

Figure 9:
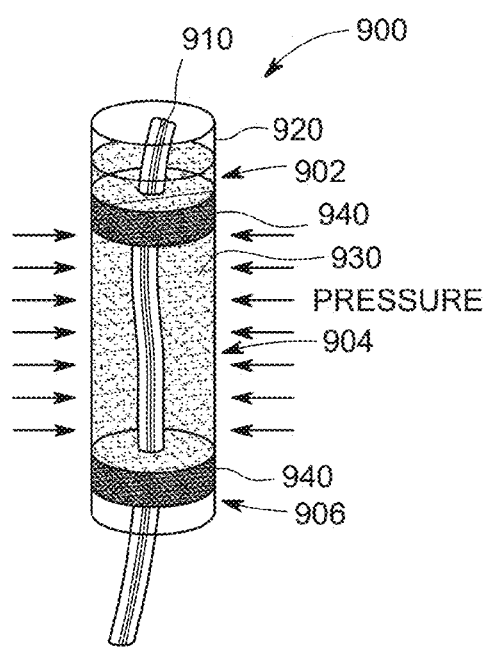
FIG. 9 is a schematic side view of a pressure sensing cable having sealingly separated chambers in accordance with various embodiments.

FIG. 9 provides a schematic illustration of a portion of a cable 900 formed in accordance with various embodiments. It may be noted that, as the pressure sensing cables discussed herein may be utilized in relatively harsh environments, the cables may be placed in a protective sleeve to prevent damage from the environment to the cable. In some embodiments, the sleeve may be a metal tube or enclosure having an oil, gel, or other material interposed between the sleeve and the cable. Optionally, holes or other openings may be present along the length of the sleeve to facilitate exertion of pressure on the cable (via the oil, gel, or other material). In other embodiments, the sleeve may include sealingly separated chambers having predetermined lengths, with the separated chambers defining the individual segments for which pressure will be independently determined. The cable 900 is an example of a cable having sealingly separated chambers.

The cable 900 includes a fiber 910 (e.g., a glass or silica fiber), a protective sleeve 920, and a fluid 930. The fiber 910, for example, may include multiple cores having different mode indices, and may include aspects generally similar to the cables or fibers disclosed herein. The protective sleeve 920 may be a relatively thin walled metal tube. As shown in FIG. 9, the protective sleeve 920 has a generally circular cross-section. However, in various embodiments, the protective sleeve 920 may have a different cross-section, for example an oval cross section, for improved compressibility and transduction of pressure from the environment to the fiber 910 via the protective sleeve 920. In some embodiments, the eccentricity of an oval cross-sectional shape of the protective sleeve 920 may vary with temperature. For example, the oval may become flatter at lower temperatures and rounder at higher temperatures. The fluid 930 in the illustrated embodiment is a pressure transducing fluid interposed between the protective sleeve 920 and the fiber 910. Pressure exerted on the protective sleeve 920 is transferred to the fiber 910 via the fluid 930. In some embodiments, the fluid 930 may have a high bulk modulus or be a very incompressible fluid, with the pressure transmitted to the fiber 910 through the fluid 930.

The cable 900 includes segments 902, 904, and 906 (only the full segment is shown for 906 for simplicity and clarity of illustration). The segments may be understood as chambers, as each segment has a volume of the fluid 930 contained therein and associated therewith. In various embodiments, the segments may be about 1 meter long and be disposed along the length of the cable 900. In some embodiments, pressure may be determined for each segment, while in other embodiments pressure may be determined for some segments but not for all segments. The cable 900 includes seals 940 disposed between the various segments. The seals 940 are configured to separate the segments and confine the pressure transducing fluid 930 of a given segment to that segment, and to prevent the pressure transducing fluid 930 from being squeezed or dispersed along the length of the cable 900. The seals 940 act to eliminate or minimize the effect of pressure on one segment of the cable from influencing the pressure measured or determined for one or more other segments of the cable.

Returning to FIG. 1, the light source 120 is operably coupled to the optical fiber 110 and is configured to transmit a signal to the optical fiber 110. For example, the depicted light source 120 is configured to transmit the light 106 to the transmission core 112 of the optical fiber 110. The configuration of the light 106 (e.g., amplitude and duration) may be selected or determined based upon, for example, the length of the cable, the mode indices of the cores, the amount of cross talk provided by the cable, the range of pressures expected to be encountered, and the like). It may be noted the light source 120 and the processing unit 130 are depicted as separate and discrete entities in FIG. 1; however, in various embodiments, aspects of the light source 120 and the processing unit 130 may be shared and/or commonly accessed. Further, in some embodiments, the light source 120 and the processing unit 130 may be combined into a single unit or device.

The depicted detection unit 150 is operably coupled to the optical fiber 110, and is configured to detect signals from the reception core 114 generated responsive to the light 106 transmitted through the transmission core 112. In some embodiments, the detection unit 150 (and/or an additional detection unit) may be coupled to the transmission core 112 and configured to detect the reflection of the pulse signal 106 after the pulse signal has traversed the transmission core 112 in both an injection and a return direction. The detected reflected pulse signal may be used as a trigger for sampling the return signals from the reception core 114, for example. The detection unit 150, for example, may be configured as a relatively fast detector with sampling rates on the order of about 1 nanosecond. The sampling rate may be adjustable, for example, to provide a sampling rate corresponding to a given combination of mode indices of the cores and segment length or resolution of a desired pressure distribution. The detection unit 150 is operably coupled to the processing unit 130 and is configured to provide signal information to the processing unit 130 corresponding to the detected signals (the signal information may be raw, or may be processed to some extent by the detection unit 150). It may be noted the detection unit 150 and the processing unit 130 are depicted as separate and discrete entities in FIG. 1; however, in various embodiments, aspects of the detection unit 150 and the processing unit 130 may be shared and/or commonly accessed. Further, in some embodiments, the detection unit 150 and the processing unit 130 may be combined into a single unit or device.

In the illustrated embodiment, the processing unit 130 is configured to determine a pressure distribution based on the signals from the transmission core 114 detected by the detection unit 150. The processing unit 120 may include processing circuitry configured to perform one or more tasks, functions, or steps discussed herein. For example, the processing unit 130 may group portions of the return signal into bins based on reception time, with each bin corresponding to a location (or range of locations such as segment) of the optical fiber 110. Then, using a predetermined relationship between signal (e.g., signal strength) and pressure, the processing unit 130 may determine the corresponding pressure for each location to provide a distributed pressure measurement. For each location the signal in the corresponding bin may be utilized to provide the pressure for the particular location. The relationship between the signal and the pressure may be experimentally determined, for example, during a calibration of the pressure sensing cable 111. The relationship may be expressed as a mathematical formula or provided via a look up table that associates pressures with signal strengths, for example.

In the illustrated embodiment, the processing unit includes a binning module 132, a determination module 134, an input/output unit 136, and a memory 138. It may be noted that the particular units or modules shown in FIG. 1 are meant by way of example, and that other arrangements of units or sub-units of the processing unit 130 may be employed in various embodiments.

Generally, in the illustrated embodiment, the binning module 132 obtains signal information from the detection unit 150 and groups the signal information into bins based on time of reception. Each bin, for example, corresponds to a range of time of reception that in turn corresponds to location along the length of the cable. The location may be a measurement portion such as an individual segment (e.g., a segment or chamber that is sealingly separated, separated by a FBG, and/or otherwise separated from other cable segments or chambers) of the pressure sensing cable 111. Further, with reference to FIG. 4 and the related discussion, it may be noted that each bin may include two time periods symmetrically disposed about an intermediate time, as each measurement position along the length of the cable may result in two portions of generated return signal (one as the light 106 travels deeper into the remote location 104 in an injection direction, and one as the light 106 travels out of the remote location 104 in a return or reflection direction). In various embodiments, a series of light pulses may be sent and a number of signal portions stored in each bin, with the signal portions in each bin averaged or otherwise combined and used to determine pressure. It may be noted that, in other embodiments, as discussed herein, for example utilizing FBG's along a length of a fiber, instead of a series of light pulses, a continuous laser, for example, may be employed that sweeps a wavelength, or as another example, a broadband light source may be employed. For such embodiments, a spectrometer may be employed to analyze the light reflected from each FBG. The detection unit 150 may be configured to group detected light reflections based on the particular FBG's corresponding to a given wavelength and location along the length of the cable.

In the illustrated embodiment, the determination module 134 obtains (e.g., receives, acquires, or the like) information (e.g., binning information) from the binning module 132, and determines the pressure along the length of the optical fiber 110 (and associated locations within the remote location 104) using the received information. For example, in some embodiments, the determination module 134 may be configured to determine the pressure for each bin and associated location along the length of the optical fiber 110 using a predetermined calibrated relationship between one or more characteristics, properties, or aspects of the portion of the signal (e.g., strength or intensity) and pressure. For example, a measured or determined amplitude or strength of signal may be compared to an amplitude or strength of signal at a known pressure. The predetermined calibrated relationship may be experimentally determined for the pressure sensing cable 111. In various embodiments, the predetermined calibrated relationship may have a general type or form that corresponds to a type (e.g., model number or other specific configuration) of pressure sensing cable 111, with various constants determined for each individual pressure sensing cable 111. The predetermined calibrated relationship may be expressed as a formula, and/or may be defined by a look-up table stored by or otherwise accessible to the processing unit 130.

As discussed herein, for example in connection with FIG. 8, the determination module 134 may further be configured to identify additional properties, such as temperature or strain, based on one or more characteristics, properties, or aspects of the return signal 108 detected from the reception core 114.

The depicted input/output unit 136 is configured to receive one or more inputs, for example, from a user, and to display or otherwise provide information to a user, for example, pressure distributions along the length of the pressure sensing cable 111 or at locations within the remote location 104 as determined by the processing unit 130, prompts to assist in the entry of information, or the like. The input/output unit 136 may include one or more of a touchscreen, keyboard, mouse, keypad, or the like. For example, a user may input a model number or other designator for a type of pressure sensing cable to be used, which may be used to determine the relationship (or form of relationship for use with calibration coefficients) between pressure and one or more signal characteristics (e.g., signal strength or amplitude) to be used by the processing unit 130 to determine pressures along the length of the pressure sensing cable 111. In some embodiments, a user may input particular calibration constants for an individual pressure sensing cable via the input/output unit 136. The input/output unit 136 may also be configured to automatically or autonomously retrieve information regarding calibration information or the like for a given pressure sensing cable via a database accessible to the input/output unit.

Figure 10:
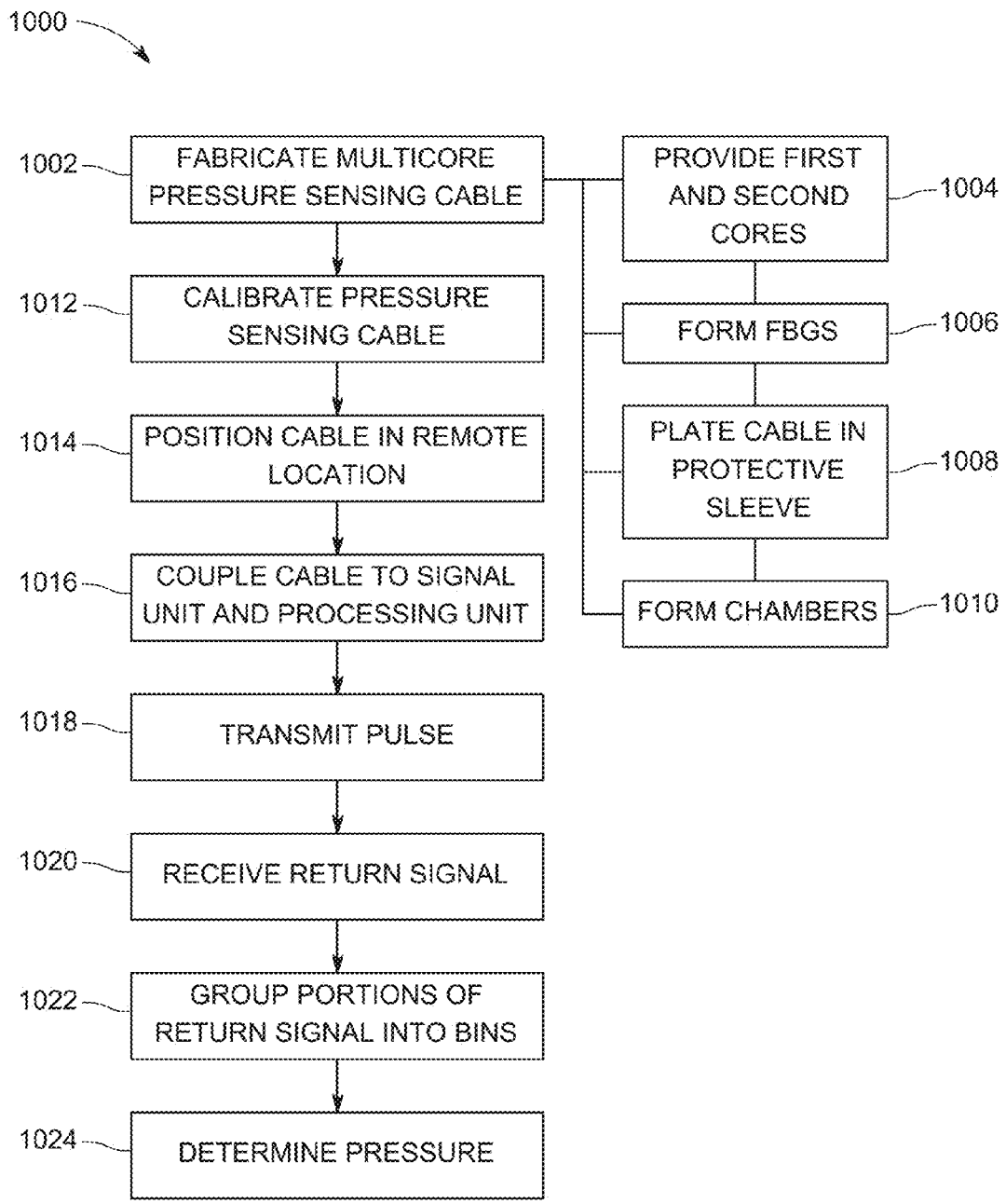
FIG. 10 is a flowchart of a method for determining pressure distributed along a cable in accordance with various embodiments.

FIG. 10 provides a flowchart of a method 1000 for determining pressure at points or locations distributed along a length of a pressure sensing cable, for example a continuous pressure distribution of a remote location (e.g., well) in which a pressure sensing cable is disposed. In various embodiments, the method 1000, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1000 may be able to be used as one or more algorithms to direct hardware to perform operations described herein. It may be noted that the method 1000 and flowchart provided in FIG. 10 are provided by way of example for illustrative purposes.

In the illustrative and non-limiting illustrated embodiment, at 1002, a multicore pressure sensing cable is fabricated. The pressure sensing cable is configured to have at least two cores having different mode indices. For example, a transmission core may be configured as an open core, and a reception core may comprise pure silica and/or other solid material. For example, in various embodiments at 1004, first and second cores are formed. In some embodiments, the first and second cores may be solid cores. The cores may be formed as part of a drawing process that forms the cable. At 1006, for example in embodiments in which the first and second cores are both solid materials, FBGs may be formed in at least one of the cores. The FBGs may be configured to help couple light between the cores for improved transmission of light from a transmission core to a reception core. In some embodiments, the cable may be positioned in a protective sleeve. For example, in the illustrated embodiment, at 1008 the cable is placed in a protective sleeve, and an intermediate material, such as a pressure transducing fluid may be disposed between the cable and the protective sleeve. In some embodiments, at 1010, seals are placed along the length of the cable to form sealingly separated chambers. Pressure may be determined independently for each chamber, so that the chamber length defines the length resolution of the pressure measurement distribution obtained using the cable. For example, each chamber may have a length of about 1 meter.

At 1012, the pressure sensing cable is calibrated. For example, the signal strength of a return signal from the pressure sensing cable may change with changes in pressure due to changes in the amount of cross talk between the transmission and reception cores under the influence of pressure. Thus, signal strength may be determined at known pressures and correlated to the pressures to determine a calibration relationship from which pressure may be determined using strength of return signal portion, for example, as an input. The calibration results may then be used, for example, by a determination module, to determine continuously distributed pressure (e.g., a continuous distribution having a length resolution corresponding to length of segments disposed along the length of the cable) along the length of the pressure sensing cable based on the strength of the portion(s) of the return signal associated with each particular location (e.g., segment). The calibration results may be used in a table form, for example, with weighted or averaged values for neighboring entries used for intermediate values not experimentally tested. As another example, the calibration data may be analyzed by curve-fitting or other analytic technique to develop a mathematical relationship between signal strength or amplitude (and/or other aspects, properties, or characteristics of a return signal from the pressure sensing cable) and pressure. The calibration results may be in the form of constants and/or coefficients for use with a general equation for a given type or model of pressure sensing cable.

At 1014, the pressure sensing cable is positioned in a remote location, such as a down-hole or well, for which measurement of distributed pressure is desired to be determined. As one example, the remote location may be a geothermal well. As another example, the remote location may be an oil well or a well associated with hydraulic fracturing. The pressure sensing cable may include one or more reference markings that may be used to associate the known or predetermined positions of the segments or chambers disposed along the length of the cable with particular locations (e.g., depths) of the remote location.

At 1016, the pressure sensing cable is coupled to a signal unit (e.g., light source 120) and a processing unit (e.g., processing unit 130). The signal unit is configured to provide an optic signal (e.g., light 106) to the pressure sensing cable, and the processing unit is configured to analyze a return signal from a reception core of the pressure sensing cable (e.g., a signal generated due to cross-talk from a transmission core to the reception core) to determine a pressure distribution for the remote location, and/or to determine pressure for various locations in the remote location.

At 1018, a light pulse is transmitted from the signal unit to the pressure sensing cable. The light pulse is provided to the transmission core of the cable and travels in an injection direction deeper into the remote location. As the light pulse travels into the remote location, and is reflected or otherwise returned to a detection unit, a return signal having various portions generated at different locations along the length of the cable is generated due to cross talk from the transmission core to the reception core. The amount of cross talk, and thus the strength of the return signal, varies with pressure.

At 1020, a return signal is received. For example, the return signal from the reception core may be detected by a detection unit operably coupled to the reception core. The return signal includes portions generated at each of various locations distributed along the length of the cable. Because the speed of light through the transmission core and the reception core is different, the location at which a particular portion of the return signal has been generated may be determined based on time of reception. In various embodiments, the return signal is provided to or otherwise acquired by the processing unit for signal processing (e.g., filtering, noise removal or reduction) and analysis.

At 1022, the various portion of the return signal are separated and stored in bins associated with particular time ranges of reception, with each time range corresponding to pressure measurement position or location (e.g., segment or chamber of the cable). In some embodiments, each pressure measurement position may define a range having a predetermined length, for example the length of a chamber or segment of the cable. The bin for each pressure measurement position may include signal information for two time ranges for each transmitted pulse—a first time range corresponding to a signal portion generated as the injection pulse travels in an injection direction, and a second time range corresponding to a signal portion generated as the injected pulse is reflected or otherwise returned in a return direction. In various embodiments, a series of pulses may be sent to provide additional portions for each bin, with the information in each bin averaged or otherwise combined.

At 1024, a pressure corresponding to each location along the length of the cable is determined using the portion(s) of the return signal that have been grouped into the particular bin associated with each particular location. In various embodiments, the strength of the signal for the portion(s) of the return signal corresponding to each location may be used to determine the pressure for the corresponding location. For example, the pressure sensing cable may be calibrated by determining the return signal strength (e.g., the strength of the signal detected from the reception core) at one or more known pressures and deriving a calibration relationship describing changes in pressure due to changes in return signal strength.

While the embodiment of FIG. 10 incorporates use of a light pulse transmitted through an optical fiber of a pressure sensing cable, it may be noted that other forms of light or energy may be employed in other embodiments. For example, as discussed in connection with FIG. 11, a laser (e.g., a laser that may be swept over a range of wavelengths), may be utilized.

Figure 11:
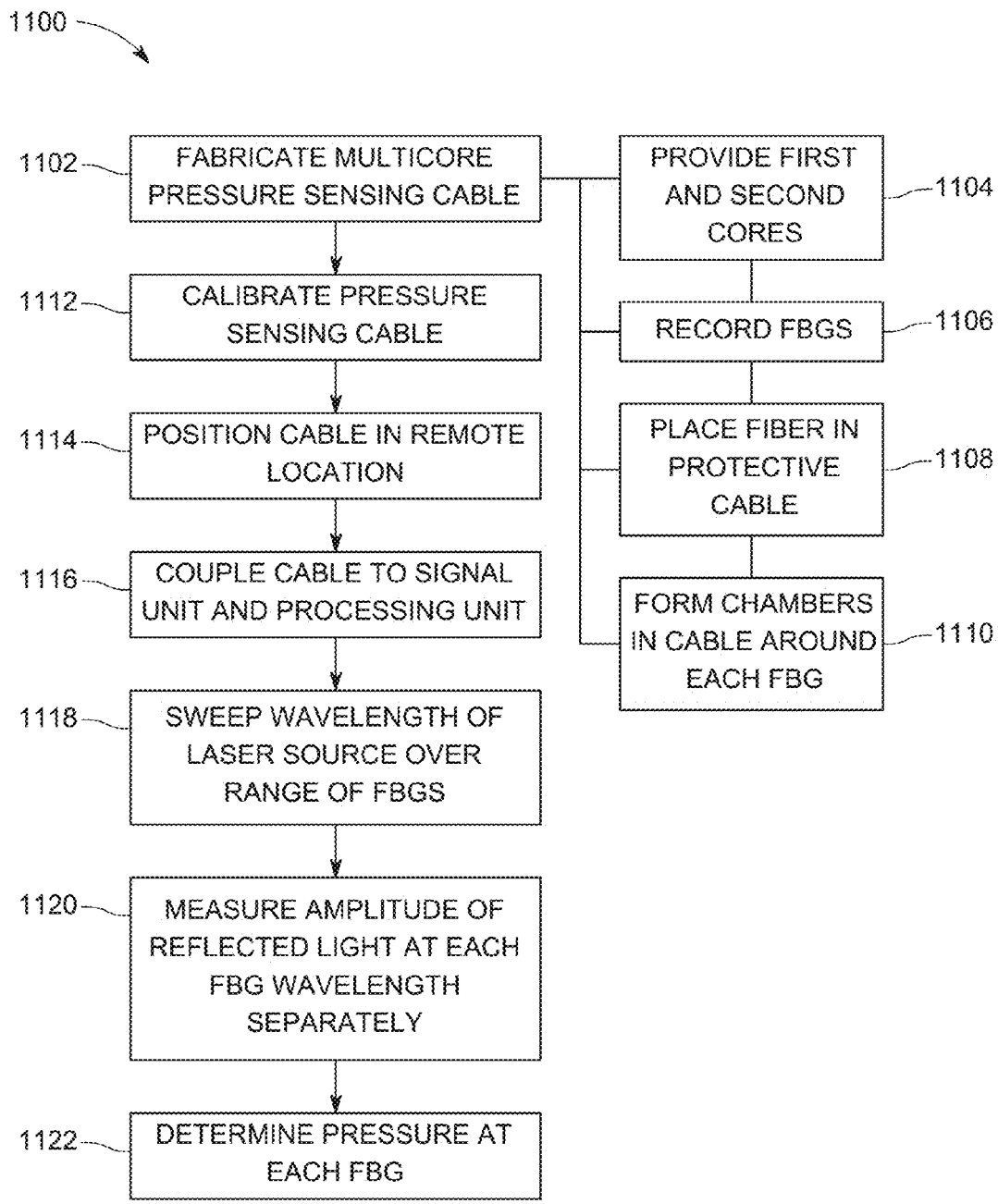
FIG. 11 is a flowchart of a method for determining pressure at locations along a cable in accordance with various embodiments.

FIG. 11 provides a flowchart of a method 1100 for determining pressure at points or locations distributed along a length of a pressure sensing cable, for example a cable disposed in a remote location (e.g., well). In various embodiments, the method 1100, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1100 may be able to be used as one or more algorithms to direct hardware to perform operations described herein. It may be noted that the method 1100 and flowchart provided in FIG. 11 are provided by way of example for illustrative purposes.

In the illustrative and non-limiting illustrated embodiment, at 1102, a multicore pressure sensing cable is fabricated. The pressure sensing cable is configured to have at least two cores having different mode indices. For example, a transmission core may be configured as an open core, and a reception core may comprise pure silica and/or other solid material. For example, in various embodiments at 1104, first and second cores are formed. In some embodiments, the first and second cores may be solid cores. The cores may be formed as part of a drawing process that forms the cable. At 1106, for example in embodiments in which the first and second cores are both solid materials, FBGs are formed in at least one of the cores. The FBGs may be configured to help couple light between the cores for improved transmission of light from a transmission core to a reception core. Further, each FBG may be configured to reflect light at a particular wavelength (or over a range of wavelengths). Each wavelength of returned light may thus be associated with a particular FBG and with a particular location along the length of the cable at which the particular FBG is positioned. In some embodiments, the cable may be positioned in a protective sleeve. For example, in the illustrated embodiment, at 1108 the cable is placed in a protective sleeve, and an intermediate material, such as a pressure transducing fluid may be disposed between the cable and the protective sleeve. In some embodiments, at 1110, seals are placed along the length of the cable to form sealingly separated chambers. Pressure may be determined independently for each chamber, so that the chamber length defines the length resolution of the pressure measurement distribution obtained using the cable. For example, each chamber may have a length of about 1 meter, and have a FBG positioned at a known predetermined position of the chamber (e.g., at an end of the chamber, or at a midpoint of the chamber).

At 1112, the pressure sensing cable is calibrated. For example, the signal strength of a return signal from the pressure sensing cable may change with changes in pressure due to changes in the amount of cross talk between the transmission and reception cores under the influence of pressure. Thus, signal strength may be determined at known pressures and correlated to the pressures to determine a calibration relationship from which pressure may be determined using strength of return signal portion, for example, as an input. The calibration results may be used in a table form, for example, with weighted or averaged values for neighboring entries used for intermediate values not experimentally tested. As another example, the calibration data may be analyzed by curve-fitting or other analytic technique to develop a mathematical relationship between signal strength or amplitude (and/or other aspects, properties, or characteristics of a return signal from the pressure sensing cable) and pressure. The calibration results may be in the form of constants and/or coefficients for use with a general equation for a given type or model of pressure sensing cable.

At 1114, the pressure sensing cable is positioned in a remote location, such as a down-hole or well, for which measurement of distributed pressure is desired to be determined. As one example, the remote location may be a geothermal well. As another example, the remote location may be an oil well or a well associated with hydraulic fracturing. The pressure sensing cable may include one or more reference markings that may be used to associate the known or predetermined positions of the segments or chambers disposed along the length of the cable with particular locations (e.g., depths) of the remote location.

At 1116, the pressure sensing cable is coupled to a signal unit and a processing unit (e.g., processing unit 130). The signal unit, as one example, may be a laser that transmits a continuous signal, for example a continuous signal that sweeps over a range of wavelengths. As another example, the signal unit may be a broadband light source. The signal unit is configured to provide an optic signal to the pressure sensing cable, and the processing unit is configured to analyze a return signal from a reception core of the pressure sensing cable (e.g., a signal generated due to cross-talk from a transmission core to the reception core) to determine a pressure distribution for the remote location, and/or to determine pressure for various locations in the remote location.

At 1118, light is transmitted from the signal unit to the pressure sensing cable. In the illustrated embodiment, a laser is transmitted and the wavelength of the laser is swept over the range of wavelengths of the FBG's. The light is provided to the transmission core of the cable and travels in an injection direction deeper into the remote location. As the light travels into the remote location, the light of a wavelength or range of wavelengths associated with each FBG is returned. The return signal thus has various portions generated at different predetermined locations along the length of the cable associated with the FBG's. The strength of the return signal varies with pressure.

At 1120, a return signal is received, and the amplitude of reflected light at each FBG wavelength is measured separately. For example, the return signal from the reception core may be detected by a detection unit operably coupled to the reception core. The return signal includes portions generated at each of various locations distributed along the length of the cable. The location at which a particular portion of the return signal has been generated may be determined based on the wavelength of the particular portion, as each FBG is associated with a corresponding wavelength. A spectrometer may be used to analyze the light reflected from the FBG's. In various embodiments, the return signal is provided to or otherwise acquired by the processing unit for signal processing (e.g., filtering, noise removal or reduction) and analysis.

At 1122, the pressure corresponding to each location along the length of the cable is determined using the portion(s) of the return signal at the wavelength of the FBG associated with each particular location. In various embodiments, the strength of the signal for the portion(s) of the return signal corresponding to each location may be used to determine the pressure for the corresponding location. For example, the pressure sensing cable may be calibrated by determining the return signal strength (e.g., the strength of the signal detected from the reception core) at one or more known pressures and deriving a calibration relationship describing changes in pressure due to changes in return signal strength.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optic drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A pressure sensing cable comprising:
an optical fiber comprising:
a first core extending internally along a length of the cable, the first core sized and configured to provide propagation of light along the first core along the length of the cable and having a first mode index corresponding to the speed of light propagation along the first core; and
a second core extending internally along the length of the cable, the second core spaced a distance from the first core, the second core sized and configured to provide propagation of light along the second core along the length of the cable and having a second mode index corresponding to the speed of light propagation along the second core, the second mode index being different from the first mode index, wherein light propagates along the second core at a different speed than along the first core.

2. The pressure sensing cable of claim 1, further comprising a plurality of openings extending along the length of the cable and disposed around at least one of the first core or the second core, the openings having a size that substantially prevents the openings from operating as cores for the propagation of light along the length of the cable.

3. The pressure sensing cable of claim 1, wherein the first core comprises a first solid material and the second core comprises a second solid material that is different than the first solid material.

4. The pressure sensing cable of claim 1, wherein at least one of the first core or the second core has one or more embedded Fiber Bragg Gratings disposed along the length of the cable.

5. The pressure sensing cable of claim 1, wherein the first core comprises an open core and the second core comprises a solid material.

6. The pressure sensing cable of claim 5, comprising a mirror disposed at a return end of the second core.

7. The pressure sensing cable of claim 1, further comprising a protective sleeve extending along at least a portion of the length of the cable and surrounding the optical fiber, the protective sleeve comprising an outer shell and an inner material, the inner material interposed between the outer shell and the optical fiber.

8. The pressure sensing cable of claim 7 in which the outer shell is substantially noncircular in cross section.

9. The pressure sensing cable of claim 1, wherein the protective sleeve comprises sealingly separated chambers having a predetermined length along the length of the cable.

10. A measurement system comprising:
a pressure sensing cable comprising;
a transmission core extending internally along a length of the cable, the transmission core sized and configured to provide propagation of light along the transmission core along the length of the cable and having a first mode index corresponding to the speed of light propagation along the transmission core; and
a reception core extending internally along the length of the cable, the reception core spaced a distance from the transmission core, the reception core sized and configured to provide propagation of light along the reception core along the length of the cable and having a second mode index corresponding to the speed of light propagation along the reception core, the second mode index being different from the first mode index, wherein light propagates along the reception core at a different speed than along the transmission core;
a light source configured to provide light energy to the transmission core;
a detection unit configured to detect signals from the reception core formed responsive to the light energy in the transmission core; and a processing unit configured to determine a pressure distribution based on the signals from the reception core detected with the detection unit.

11. The measurement system of claim 10, wherein the light energy comprises a pulse, wherein the processing unit is configured to group portions of the signals detected by the detector unit into bins based on time of detection, wherein the time of detection corresponds to a measurement position along the length of the cable.

12. The measurement system of claim 11, wherein each measurement position along the length of the cable corresponds to two time periods symmetrically disposed about an intermediate time, wherein each bin comprises portions of the signals detected by the detector unit corresponding to the two time periods.

13. The measurement system of claim 10, wherein the light energy comprises at least one of a broadband light or a laser swept across a range of wavelengths, wherein the processing unit is configured to group portions of the signals detected by the detector unit based on wavelength, wherein the wavelength corresponds to a measurement position along the length of the cable.

14. The measurement system of claim 10, wherein the transmission core comprises an open core and the reception core comprises a solid material.

15. The measurement system of claim 10, wherein the transmission core comprises a first solid material and the reception core comprises a second solid material that is different than the first solid material.

16. A method comprising:

transmitting, via a light source, light energy down a first core of a pressure sensing cable, the first core having a first mode index corresponding to the speed of light propagation along the first core;

receiving, via a detector unit, signals from a second core of the pressure sensing cable formed responsive to the transmitting the light energy down the first core, the second core having a second mode index corresponding to the speed of light propagation along the second core, the second mode index being different from the first mode index, wherein light propagates along the second core at a different speed than along the first core; and determining, using one or more processors, a pressure distribution along a length of the pressure sensing cable based upon the signals received from the second core via the detector unit.

17. The method of claim 16, wherein transmitting light energy comprises transmitting a series of light energy pulses, and wherein determining the pressure distribution comprises grouping portions of the signals received from the second core into bins based on time of detection, wherein the time of detection corresponds to a measurement position along the length of the pressure sensing cable.

18. The method of claim 17, wherein each measurement position along the length of the cable corresponds to two time periods symmetrically disposed about an intermediate time, wherein each bin comprises portions of the signals detected by the detector unit corresponding to the two time periods.

19. The method of claim 16, wherein transmitting light energy comprises transmitting at least one of a broadband light or a laser swept across a range of wavelengths, and wherein determining the pressure distribution comprises grouping portions of the signals received from the second core into bins based on wavelength, wherein the wavelength corresponds to a measurement position along the length of the pressure sensing cable.

20. The method of claim 16, comprising determining a pressure for predetermined intervals over the length of the cable.

* * * * *

UNITED STATES PATENT AND TRADEMARK OFFICE
CERTIFICATE OF CORRECTION

PATENT NO. : 9,240,262 B1  
APPLICATION NO. : 14/336105  
DATED : January 19, 2016  
INVENTOR(S) : Challener et al.

Page 1 of 1

It is certified that error appears in the above-identified patent and that said Letters Patent is hereby corrected as shown below:

On the Title Page, in Item (72), under "Inventors", in Column 1, Line 2, delete "Sabami" and insert -- Sabarni --, therefor.

IN THE SPECIFICATION

In Column 10, Line 53, delete "portion 310" and insert -- portion 320 --, therefor.

In Column 11, Line 27, delete "portion 310." and insert -- portion 320. --, therefor.

In Column 17, Line 47, delete "transmission core 114" and insert -- transmission core 112 --, therefor.

In Column 17, Line 48, delete "processing unit 120" and insert -- processing unit 130 --, therefor.

Signed and Sealed this
Nineteenth Day of April, 2016

Michelle K. Lee
*Director of the United States Patent and Trademark Office*